United States Patent
Yamazaki (10) Patent No.: US 7,099,703 B1
(45) Date of Patent: Aug. 29, 2006

(54) DATA COMMUNICATION SYSTEM

(75) Inventor: Akihisa Yamazaki, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 380 days.

(21) Appl. No.: 09/578,679

(22) Filed: May 26, 2000

(30) Foreign Application Priority Data

May 26, 1999 (JP) ................................. 11-145997

(51) Int. Cl.
*H04B 1/38* (2006.01)
(52) U.S. Cl. .................... 455/567; 455/556.1; 455/566
(58) Field of Classification Search ................ 455/556, 455/557, 567, 566, 401, 426, 412, 417, 420, 455/38.2, 38.4, 435, 452, 556.1
See application file for complete search history.

(56) References Cited

U.S. PATENT DOCUMENTS

| | | | |
|---|---|---|---|
| 5,559,860 A * | 9/1996 | Mizikovsky | ............... 455/413 |
| 5,870,679 A | 2/1999 | Ezumi | |
| 6,169,908 B1 * | 1/2001 | Mannak | ...................... 340/7.1 |
| 6,181,954 B1 * | 1/2001 | Monroe et al. | ............. 455/557 |
| 6,327,476 B1 * | 12/2001 | Koscal | ........................ 455/462 |
| 2001/0004598 A1 * | 6/2001 | Sato | ........................... 455/445 |
| 2002/0037743 A1 * | 3/2002 | Takahashi | ................... 455/556 |

FOREIGN PATENT DOCUMENTS

| | | |
|---|---|---|
| JP | 6-125298 | 5/1994 |
| JP | 8-102801 | 4/1996 |
| JP | 10-210183 | 8/1998 |
| JP | 10-224859 | 8/1998 |

* cited by examiner

*Primary Examiner*—Joseph Feild
*Assistant Examiner*—S. Smith
(74) *Attorney, Agent, or Firm*—Birch, Stewart, Kolasch & Birch, LLP (57) ABSTRACT

When data other than voice data has been transmitted to a mobile telephone, the user is notified of a device that is capable of responding to the transmitted data. If data to be transmitted to the mobile telephone is not image data, the mobile telephone issues an incoming-call tone. If data to be transmitted to the mobile telephone is image data and there is a device available that is capable of displaying an image, the device that is capable of displaying the image issues an incoming-call tone.

8 Claims, 10 Drawing Sheets

DATA COMMUNICATION SYSTEM

BACKGROUND OF THE INVENTION

1. Field of the Invention

This invention relates to a data communication system comprising a mobile telephone capable of communicating with a communication apparatus via a network, and an image processing unit capable of data communication with this mobile telephone and of image output. The invention relates further to the mobile telephone and image processing apparatus constituting this image communication system, and to a method of controlling the mobile telephone and image processing unit.

2. Description of the Related Art

The proliferation of mobile telephones [inclusive of portable telephones compliant with the PHS (Personal Handy Phone System) standard] and personal digital assistants (PDAS) has made it possible to send and receive voice and image data regardless of time and place. Standards for end-to-end communication between mobile telephones and personal digital assistants also are being instituted in stages.

Not only voice data but also various other data such as image and text data can be transmitted to a mobile telephone. Though a mobile telephone can receive this voice data and enable voice to be heard, often these telephones do not have the capability to receive the image data and display an image represented by this image data. Mobile telephones that can receive the text data and display the text represented by this data have been realized but the number of characters that can be displayed is small.

When data is transmitted to a mobile telephone, an alert tone indicative of the incoming call is issued by the mobile telephone irrespective of whether the incoming data is voice, image or text data. When voice data is received, it is possible to converse using the mobile telephone. When data other than voice data, e.g., image data, is received, however, often the image cannot be displayed even if the mobile telephone is operated in response to the incoming-call alert. Depending upon the received data, therfore, it is necessary to operate a personal digital assistant that is capable of displaying an image.

SUMMARY OF THE INVENTION

Accordingly, an object of the present invention is to arrange it so that even when a mobile telephone has received data other than voice data, the device that should be operated in such case can be ascertained without operating the mobile telephone.

A data communication system according to a first aspect of the present invention comprises a mobile telephone capable of communicating with a communication apparatus via a network, and an image processing unit capable of data communication with the mobile telephone and of image output.

The mobile telephone includes a first data receiving unit for receiving data transmitted from the communication apparatus; a data transmitting unit for transmitting the data received by the first data receiving unit to the image processing unit; and an incoming-voice alert generating unit for issuing an incoming-call alert (a tone or a display or vibration indicative of the alert) when data that has been received by the first data receiving unit is data representing voice data (or is the voice data itself).

The image processing unit includes a second data receiving unit for receiving data transmitted from the data transmitting unit of the mobile telephone, and an incoming-image alert generating unit for generating an incoming-call alert when data that has been received by the second data receiving unit is data representing image data (or is the image data itself).

Thus, in accordance with the first aspect of the present invention, image data that has been transmitted from the communication apparatus is received by the mobile telephone. If the received data is data representing voice data, the mobile telephone can produce a voice output and therefore issues an incoming-call alert. If the received data is data other than voice data, e.g., image data, often the mobile telephone cannot output the image. In this case, therefore, the image processing unit produces the incoming-call alert.

Thus the user can tell immediately which device should be operated because the device will be producing the incoming-call alert. Even if received data is data that cannot be processed by the mobile telephone, as when the data is image data, the user is capable of ascertaining immediately the device that can process this data.

According to a second aspect of the present invention, there is provided a mobile telephone capable of communicating with a communication apparatus via a network and with an image processing unit that is capable of outputting an image, comprising: a data receiving unit for receiving data transmitted from the communication apparatus; a data transmitting unit for transmitting the data received by the data receiving unit to the image processing unit; and an incoming-call alert generating unit for issuing a first incoming-call alert when data that has been received by the data receiving unit is data representing voice data and a second incoming-call alert, which is different from the first incoming-call alert, when the data that has been received by the data receiving unit is data representing image data.

The second aspect of the present invention provides also a method of controlling the mobile telephone described above. Specifically, there is provided a method of controlling a mobile telephone capable of communicating with a communication apparatus via a network and of communicating with an image processing unit that is capable of outputting an image, the method comprising the steps of: receiving data, which is transmitted from the communication apparatus, in such a manner that the data can be transmitted to the image processing unit; issuing a first incoming-call alert when the received data is voice data; and issuing a second incoming-call alert, which is different from the first incoming-call alert, when the received data is image data.

In accordance with the second aspect of the present invention, the first incoming-call alert is issued if data representing voice data is received, and the second incoming-call alert is issued if data representing image data is received.

Since the user can tell that voice data has been received by becoming aware of the first incoming-call alert, the user knows that the call can be answered by the mobile telephone. Since the user can tell that image data has been received by becoming aware of the second incoming-call alert (which is of a form different from that of the first incoming-call alert), the user knows that the call cannot be answered by the mobile telephone. Hence the user operates the image processing unit to enable receipt of the data transmitted from the communication apparatus.

There will be instances where the image processing unit cannot receive data, as when the unit has been turned off. At such times data indicative of this situation is transmitted to the communication apparatus that transmitted the data. If necessary, the user of the communication apparatus that transmitted the data places a call to the mobile telephone to communicate the fact that the image processing unit should be turned on.

According to a third aspect of the present invention, there is provided a mobile telephone capable of communicating with a communication apparatus via a network and with a plurality of image processing units that are capable of outputting images, comprising: a data receiving unit for receiving data transmitted from the communication apparatus; a data transmitting unit for transmitting the data received by the data receiving unit to the image processing units; an incoming-voice alert generating unit for issuing an incoming-call alert when data that has been received by the data receiving unit is data representing voice data; a setting unit for setting which of the plurality of image processing units is to receive image data; and an incoming-call alert generation controller (incoming-call alert generation control means) for controlling the plurality of image processing units in such a manner the image processing unit that has been set by the setting unit will issue an incoming-call alert when it receives data representing image data.

The third aspect of the present invention provides also a method of controlling the mobile telephone described above. Specifically, there is provided a method of controlling a mobile telephone capable of communicating with a communication apparatus via a network and of communicating with a plurality of image processing units that are capable of outputting images, the method comprising the steps of: receiving data, which is transmitted from the communication apparatus, in such a manner that the data can be transmitted to the image processing units; issuing an incoming-call alert when data that has been received is data representing voice data; setting which of the plurality of image processing units is to receive image data; and controlling the plurality of image processing units in such a manner the image processing unit that has been set will issue an incoming-call alert when it receives data representing image data.

Thus, the third aspect of the present invention of the present invention is such that if a plurality of image processing units have been connected to the mobile telephone, the image processing unit that will issue the alert of an incoming call is set. If data other than voice data, e.g., data representing image data, is received, the image processing unit that has been set issues the incoming-call alert to the mobile telephone.

Thus an image processing unit that will output images or text is capable of issuing the incoming-call alert. This makes it possible to prevent unnecessary issuance of incoming-call alerts.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Preferred embodiments of the present invention will now be described with reference to the drawings.

Figure 1:
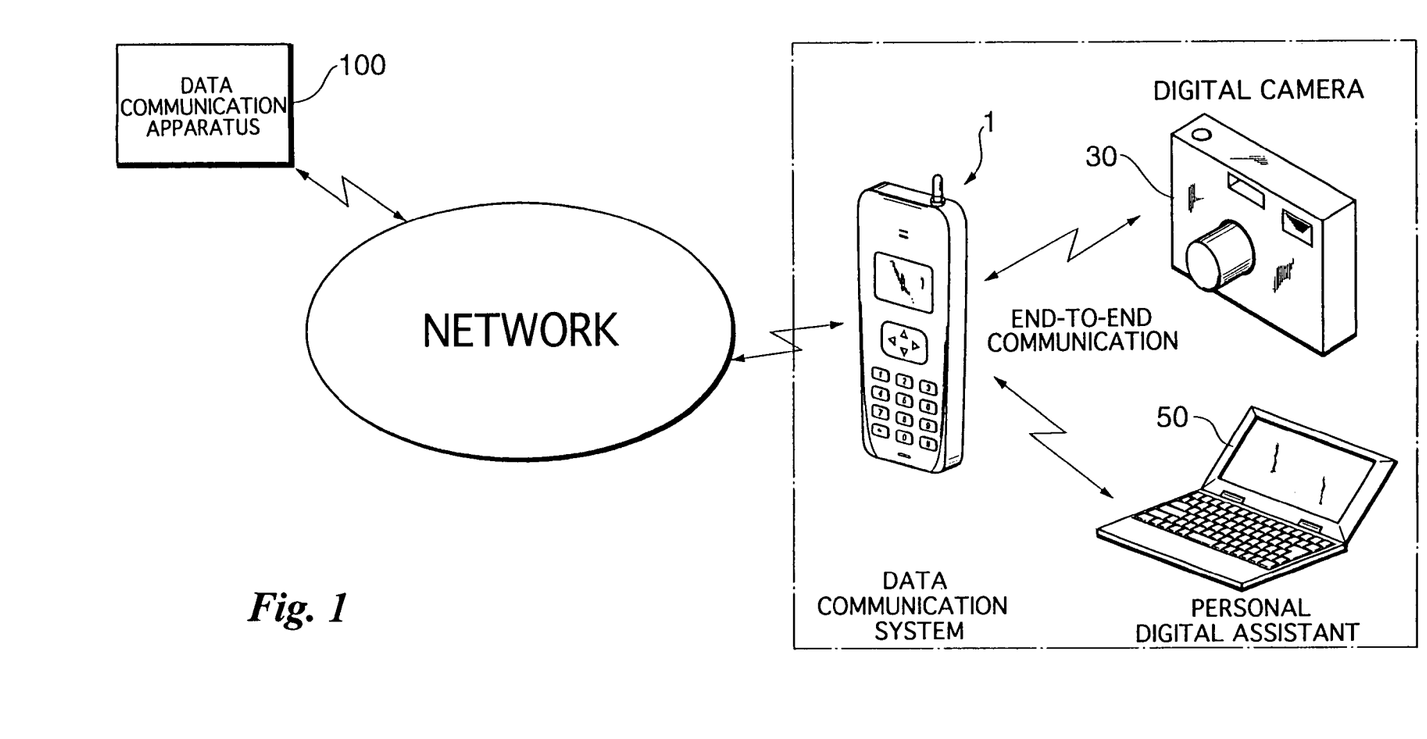
FIG. 1 is a diagram showing an overview of a data communication system according to a preferred embodiment of the present invention.

FIG. 1 illustrates an overview of a data communication system according to a preferred embodiment of the present invention.

As shown in FIG. 1, the data communication system is capable of data communication with a data communication apparatus 100 via a network. The data communication system in this embodiment includes a mobile telephone 1 capable of data communication with the data communication apparatus 100 via the network, a digital camera 30 capable of end-to-end communication with the mobile telephone 1, and a personal digital assistant 50 capable of end-to-end communication with the mobile telephone 1. The digital camera 30 and personal digital assistant 50 both can perform end-to-end communication with the mobile telephone and construct the data communication system. However, a communication system can be constructed by the mobile telephone 1 and either the digital camera 30 or personal digital assistant 50.

Figure 2:
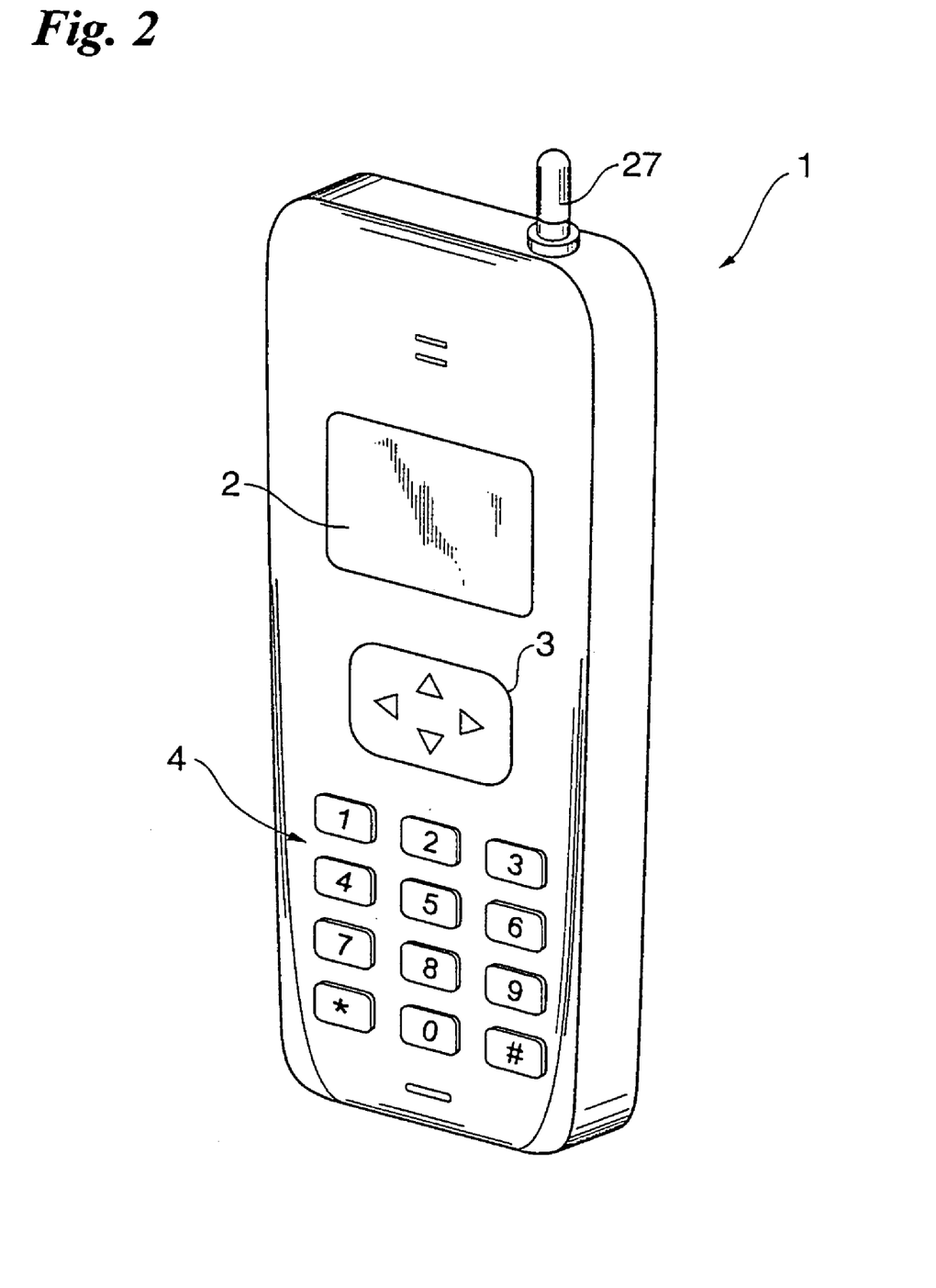
FIG. 2 is a perspective view of a mobile telephone according to this embodiment.

FIG. 2 is a perspective view of the mobile telephone 1.

As shown in FIG. 2, the mobile telephone 1 has a front side the upper part of which is formed to have a liquid crystal display device 2. Provided below the liquid crystal display device 2 are up, down, left and right keys 3 on which arrow marks indicating the up, down, left and right directions are formed. The arrow marks for the up, down, left and right directions on the keys 3 can be pressed. A numeric key pad 4 is provided below the direction keys 3 and can be used to enter a telephone number.

An antenna 27 is provided on the top of the mobile telephone 1. As will be described later, the antenna 27 serves as both an antenna 12 for data communication with the data communication apparatus 100 via the network and an antenna 26 for end-to-end communication with the digital camera 30 and personal digital assistant 50.

Figure 3:
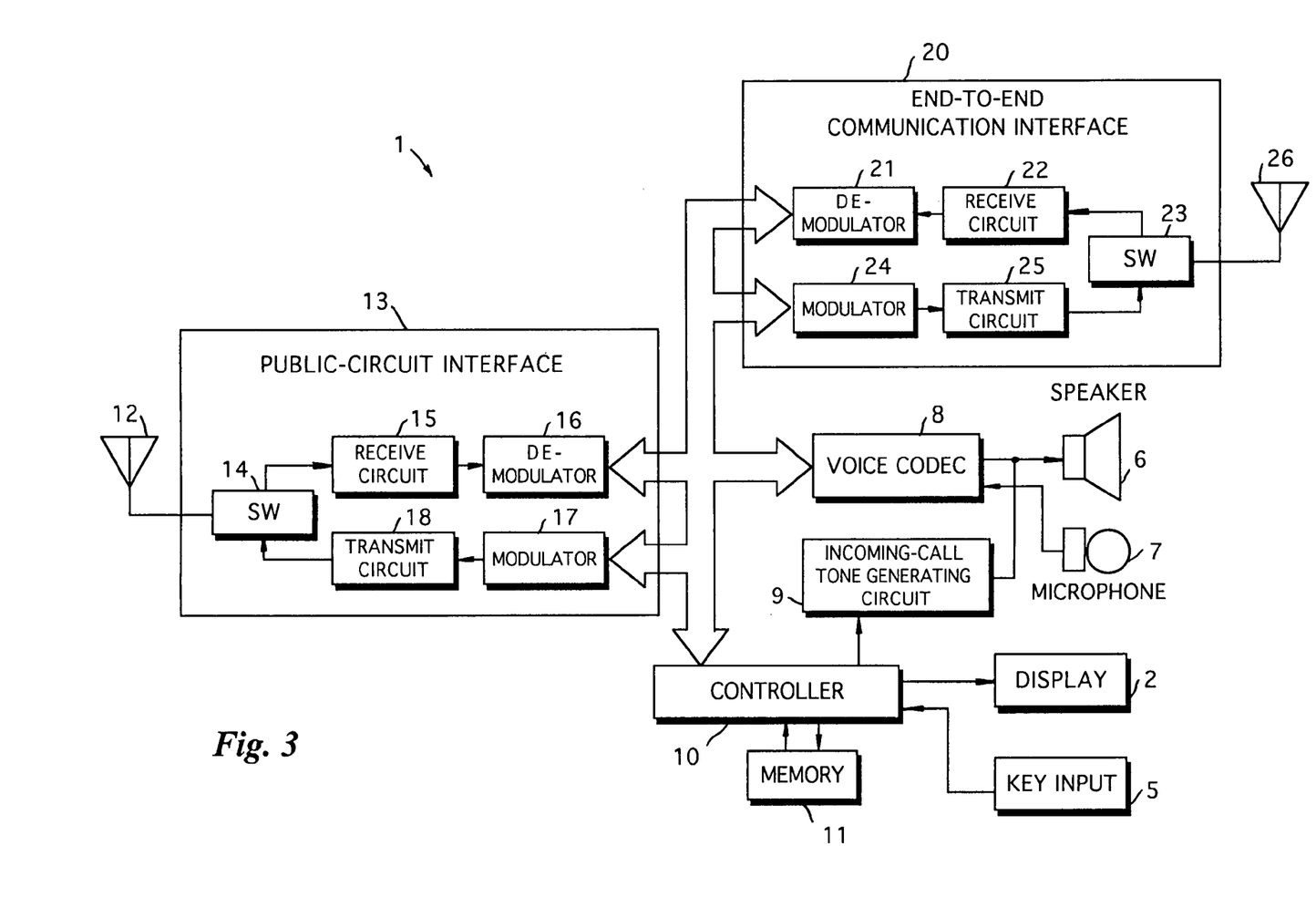
FIG. 3 is a block diagram showing the electrical construction of the mobile telephone.

FIG. 3 is a block diagram illustrating the electrical construction of the mobile telephone 1.

The overall operation of the mobile telephone 1 is controlled by a control circuit 10.

Signals representing inputs from the up, down, left and right keys 3 and numeric key pad 4 (key input unit 5) are applied to the control circuit 10.

The mobile telephone 1 includes a speaker 6, a microphone 7 and a public-circuit interface 13 for performing data communication with the data communication apparatus 100 via the network, as set forth above. The interface 13 has a switch 14 which is changed over in such a manner that when the mobile telephone 1 receives data sent from the data communication apparatus 100, the entered data is applied to a receive circuit 15, whereas when the mobile telephone 1 transmits data to the data communication apparatus 100, data output from a transmit circuit 18 is applied to the antenna 12.

Data that has been transmitted from the data communication apparatus 100 enters the public-circuit interface 13 and is input to a demodulating circuit 16 via the switch 14 and receive circuit 15. The demodulating circuit 16 demodulates data that has been modulated. If the received data is voice data, the voice data is converted to a voice signal by a voice codec 8. The voice signal obtained by this conversion is applied to the speaker 6, whence voice is output.

If voice is input from the microphone 7, a voice signal is output. The voice signal is converted to voice data by the voice codec 8 and the voice data enters a modulating circuit 17. The latter modulates the voice data, which is then transmitted from the antenna 12 via the transmit circuit 18 and switch 14. The transmitted voice data is transmitted to the data communication apparatus (a telephone in this case) 100, which is specified by a telephone number that has been entered by the key pad 4.

The mobile telephone 1 further includes an incoming-call tone generating circuit 9 which, when data has been received, generates an incoming-call tone as necessary. Processing for generating the incoming-call tone will be described later in greater detail.

The mobile telephone 1 is provided with an end-to-end communication interface 20 for end-to-end communication with the digital camera 30 and personal digital assistant 50. An antenna 26 is provided for end-to-end communication. The mobile telephone 1 thus performs data communication with the digital camera 30 and personal digital assistant 50.

When data is transmitted to the digital camera 30, the data is applied to a modulating circuit 24 of the end-to-end communication interface 20. The modulating circuit 24 modulates the data and the modulated data is then transmitted to the digital camera 30 and personal digital assistant 50 from the antenna 26 via a transmit circuit 25 and switch 23.

Data that has been transmitted from the digital camera 30 or personal digital assistant 50 is received by the antenna 26 and then input to a demodulating circuit 21 via the switch 23 and a receive circuit 22. The demodulating circuit 21 demodulates the data and transmits the demodulated data to the data communication apparatus 100 via the public-circuit interface 13.

The mobile telephone 1 further includes a memory 11 in which necessary data is stored.

Figure 4:
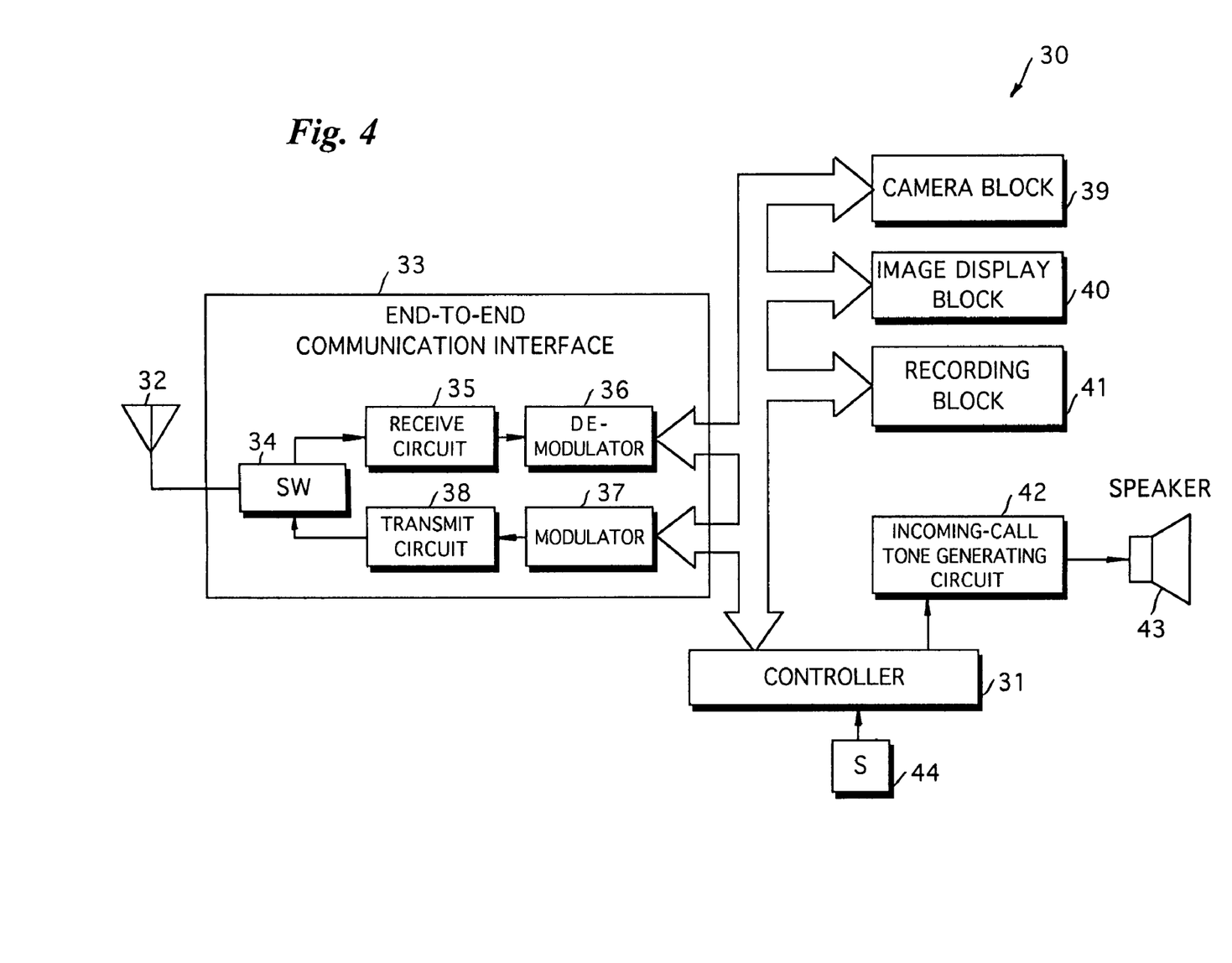
FIG. 4 is a block diagram showing the electrical construction of a digital camera.

FIG. 4 is a block diagram illustrating the electrical construction of the digital camera 30.

The overall operation of the digital camera 30 is controlled by a control circuit 31.

The digital camera 30 includes a shutter-release button 44 which, when pressed, sends a signal indicative thereof to the control circuit 31.

The digital camera 30 is equipped with a camera block 39 that includes a solid-state electronic image sensing device for outputting a video signal representing the image of a subject, an analog/digital converting circuit and a signal processing circuit, etc. Digital image data representing the image of the subject is output from the camera block 39.

An image display block 40 includes a monitor display unit. If digital image data output from the camera block 39 is input to the image display block 40, the image represented by the entered image data is displayed on the monitor display unit.

A recording block 41 includes a recording control circuit and a memory card (which may be removable or built-in). If image data output from the camera block 39 enters the first image-recording memory card 41, the entered image data is recorded on the memory card.

The digital camera 30 further includes an incoming-call tone generating circuit 42 for outputting an incoming-call tone from a speaker 43.

The digital camera 30 is capable of performing end-to-end communication with the mobile telephone 1. To accomplish this, the digital camera 30 includes an antenna 32 and an end-to-end communication interface 33.

A signal that has been received by the antenna 32 is input to the end-to-end communication interface 33, wherein the signal is input to a demodulating circuit 36 via a changeover switch 34 and receive circuit 35. The demodulating circuit 36 demodulates the received signal. The signal output from the demodulating circuit 36 is applied to the image display block 40 as necessary, whereby an image or text represented by the signal is displayed. Further, the signal output from the demodulating circuit 36 is applied to the first image-recording memory card 41, whereby the signal is recorded on the memory card.

The end-to-end communication interface 33 further includes a modulating circuit 37 and a transmit circuit 38. Thus, image data that has been obtained by imaging a subject can be transmitted to the mobile telephone 1 as well. Image data that has been recorded in the incoming-call tone generating circuit 42 is modulated in the modulating circuit 37. The modulated image data is applied to the antenna 32 via the transmit circuit 38 and changeover switch 34 and then is transmitted to the mobile telephone 1.

Figure 5:
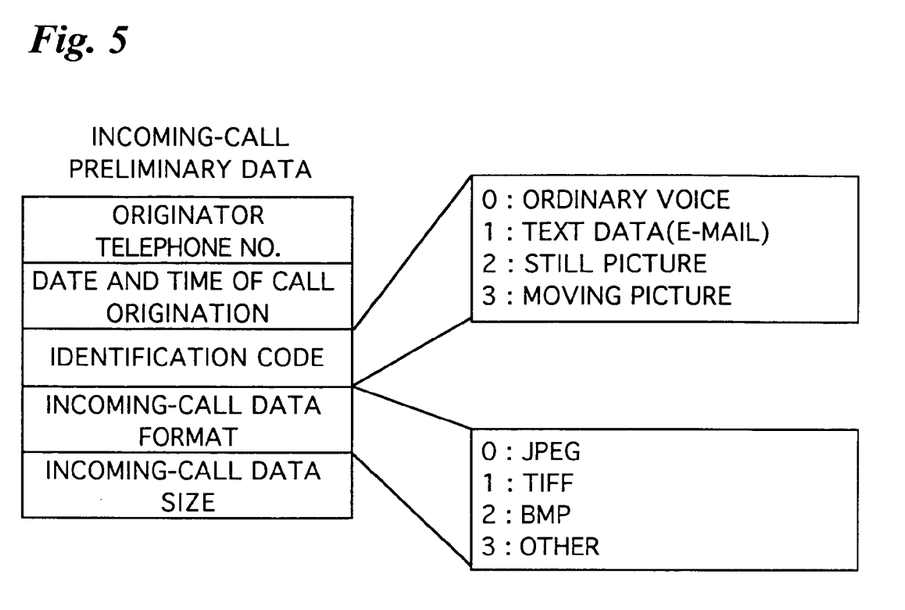
FIG. 5 shows the data format of incoming-call preliminary data.

FIG. 5 shows the data format of incoming-call preliminary data.

When data is transmitted from the data communication apparatus 100 to the mobile telephone 1, incoming-call preliminary data is transmitted from the data communication apparatus 100 to the mobile telephone 1 before the transmission data. The transmission of this incoming-call preliminary data is followed by the transmission of data such as voice or image data.

The incoming-call preliminary data includes the telephone number of the originating party, the date and time of call origination, an identification code which identifies the type of incoming-call information, the incoming-call data format and the incoming-call data size.

The telephone number of the originating party indicates the telephone number of the data communication apparatus 100 that is to transmit the succeeding data. The date and time of call origination represent the date and time of data transmission. The identification code identifies the type of transmit data that will follow the incoming-call preliminary data. In the identification code according to this embodiment, "0", "1", "2" and "3" indicate ordinary voice, text data (E-mail), a still picture and a moving picture, respectively. The data format of the incoming call indicates the format of the data that will be transmitted following the incoming-call preliminary data. Specifically, "0", "1", "2" and "3" indicate JPEG (Joint Photographic Experts Group), TIFF (Tag Image File Format), bitmap (BMP) and "Other", respectively. The data size of the incoming call indicates the amount of data that will be transmitted.

Figure 6:
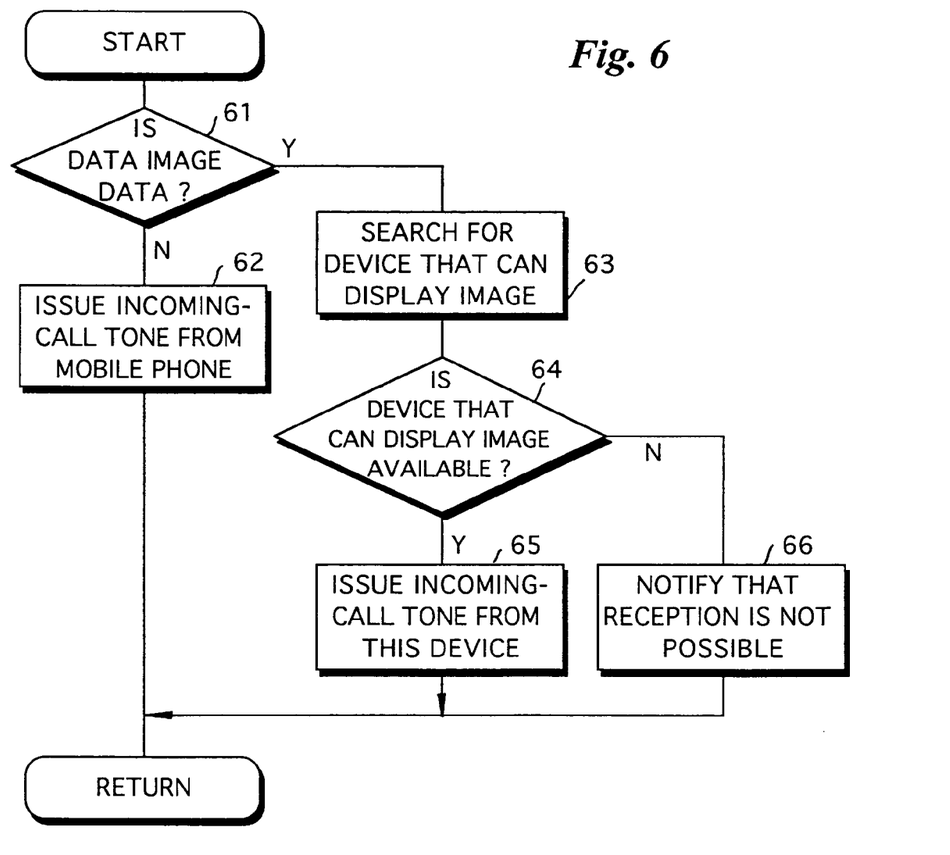
FIGS. 6 and 7 are flowcharts illustrating processing executed when data is transmitted from a data communication apparatus to the mobile telephone.

FIG. 6 is a flowchart illustrating processing executed when data is transmitted from the data communication apparatus 100 to the mobile telephone 1.

Before data is transmitted from the data communication apparatus 100 to the mobile telephone 1, the incoming-call preliminary data is transmitted from the data communication apparatus 100 to the mobile telephone 1. The incoming-call preliminary data is input to the control circuit 10 via the antenna 12 and public-circuit interface 13 of the mobile telephone 1. On the basis of the identification code in the incoming-call preliminary data identifying the type of incoming-call information, the control circuit 10 determines whether the data that will be sent is image data (still-picture data or moving-picture data) (step 61).

If the data that will be transmitted is not image data ("NO" at step 61), i.e., if the data is voice data or text data, the mobile telephone 1 can be used for conversation or to display text. In order to alert the user to respond by using the mobile telephone 1, an incoming-call tone is generated by the speaker 6 of the mobile telephone 1 (step 62).

If the data that will be transmitted is image data ("YES" at step 61), the image represented by this image data cannot be displayed or cannot be recorded using the mobile telephone 1. Accordingly, the mobile telephone 1 performs end-to-end communication with another communication apparatus, the digital camera 30 and the personal digital assistant 50. In this end-to-end communication, it is determined whether the device that can display the image is capable of end-to-end communication with the mobile telephone 1 (step 63). For example, it is judged that the digital camera 30, which can display images and recording image data, is the device that is capable of displaying the image. Whether or not the device capable of displaying the image can perform end-to-end communication with the mobile telephone 1 may be set in the mobile telephone 1 in advance or may be determined by actually performing end-to-end communication between the mobile telephone 1 and another device.

In a case where a device capable of displaying an image is included among the devices capable of performing end-to-end communication with the mobile telephone 1 ("YES" at step 64), then an incoming-call tone is generated by this device capable of displaying the image (step 65). Since the device capable of displaying the image generates the incoming-call tone, the image represented by the image data can be displayed by operating this device. The device that should be operated can be ascertained by the user unerringly. This makes it possible to prevent a situation in which the user performs troublesome operations twice, such as when the user first answers using the mobile telephone 1, then discovers that the incoming data is image data and then operates the device that can display the image. After the incoming-call tone is generated, the image data is transmitted from the data communication apparatus 100 and is recorded in, e.g., the digital camera 30 via the mobile telephone 1.

If a device that can display an image is not included among the devices capable of performing end-to-end communication with the mobile telephone 1 ("NO" at step 64), data indicating the fact that reception is not possible is transmitted from the mobile telephone 1 to the data communication apparatus 100 that transmitted the incoming-call data (step 66). If necessary the user of the data communication apparatus 100 telephones the mobile telephone 1 and communicates, by voice, the fact that image data is desired to be transmitted. The user of the mobile telephone 1 then responds by preparing a device that can undergo end-to-end communication with the mobile telephone 1 and that is capable of displaying the image data. This makes it possible to display the image.

In the embodiment described above, the mobile telephone 1 issues an incoming-call tone when the data transmitted from the data communication apparatus 100 is text data. However, an arrangement may be adopted in which the text data is transmitted to the digital camera 30 or personal digital assistant 50 and the digital camera 30 or personal digital assistant 50 is made to issue the incoming-call tone.

Further, though an incoming-call tone is issued in the foregoing embodiment, an arrangement may be adopted in which the user is alerted not by sound but by an image display or vibration. It goes without saying that if vibration is used, each device must be provided with a circuit for producing vibration.

Figure 7:
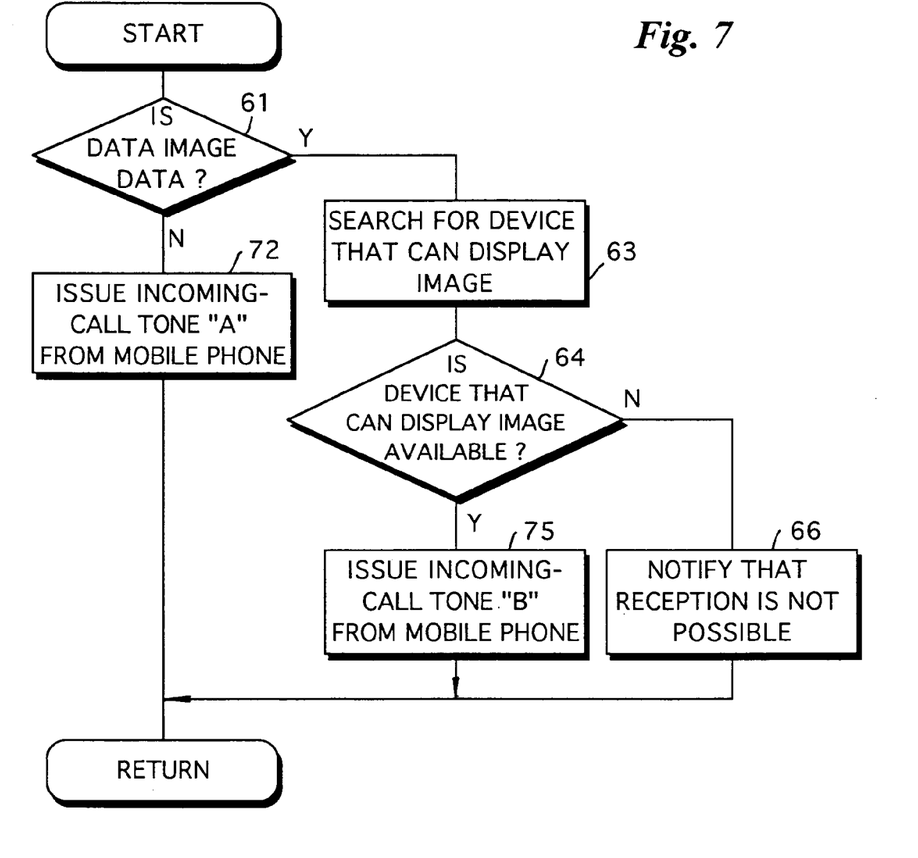

FIG. 7 is a flowchart illustrating processing executed when data is transmitted from the data communication apparatus 100 to the mobile telephone 1 according to another embodiment of the present invention. Processing steps in FIG. 7 identical with those shown in FIG. 6 are designated by like step numbers and need not be described again.

In this processing, a prescribed incoming-call tone A is generated by the mobile telephone 1 (step 72) when data to be transmitted from the data communication apparatus 100 is not image data ("NO" at step 61). An incoming-call tone B, which differs from the incoming-call tone A, is generated by the mobile telephone 1 (step 75) when data to be transmitted from the data communication apparatus 100 is image data and a device that can display the image is capable of end-to-end communication with the mobile telephone 1 ("YES" at step 64).

Thus, the user knows to respond by using the mobile telephone 1 upon hearing the incoming-call tone A and knows to respond by using the device having the image display capability upon hearing the incoming-call tone B. Since the user knows which device should be operated before responding, unnecessary operation is eliminated.

Figure 8:
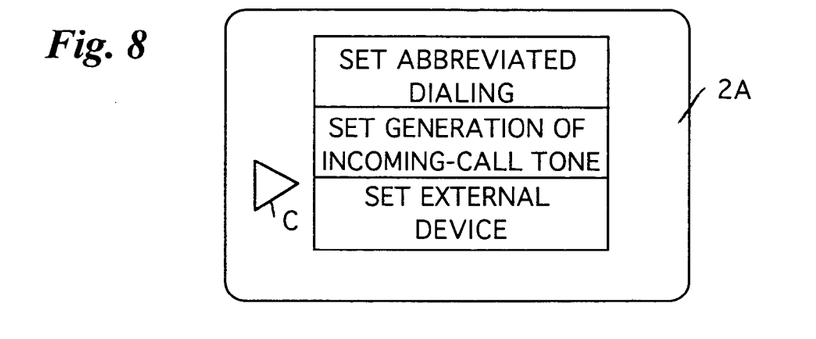
FIGS. 8 to 10 illustrate examples of screens displayed on the mobile telephone.
Figure 9:
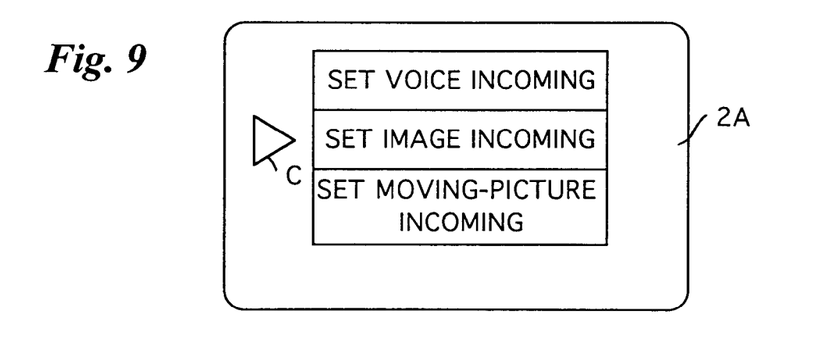
Figure 10:
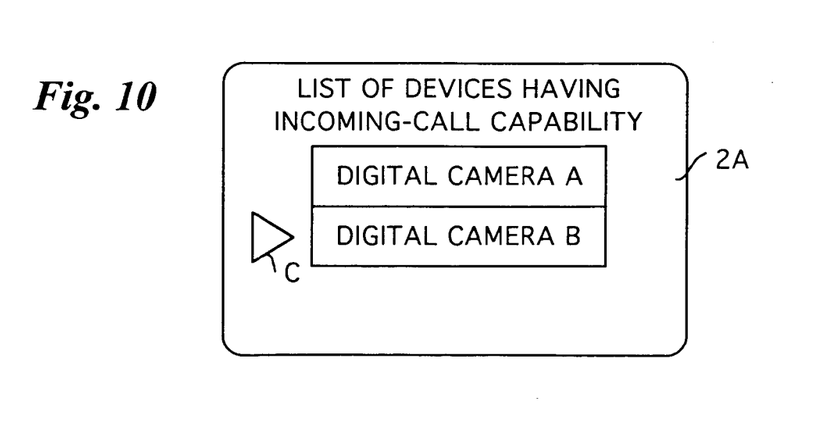

FIGS. 8 to 10 illustrate a display screen 2A on the display unit of the mobile telephone 1.

The mobile telephone 1 can be configured in various ways using the up, down, left, right keys 3 and the numeric key pad 4. Described next will be processing in which when there are a plurality of devices available for displaying an image, a particular one of these devices that will be made to display the image is set (this is an external device setting).

As shown in FIG. 8, a settings menu is displayed on the display screen 2A. The menu allows the setting of abbreviated dialing, the setting of the incoming-call tone (a setting such that the incoming-call tone A is generated when voice data is received and the incoming-call tone B when image data is received, as described earlier), and the setting of an external device.

A cursor C appears on the liquid crystal display device 2A. The cursor C is moved upward by pressing the up arrow on the up, down, left, right keys 3 and is moved downward by pressing the down arrow. When the setting of an external device is to be made, the up and down keys are pressed so as to bring the cursor to the external-device setting item in the menu. If a sharp key on the numeric key pad 4 is pressed while the cursor C is being displayed at the external-device setting item in the menu, the display screen changes over as shown in FIG. 9.

A menu screen for incoming-call settings appears on the display screen. The menu screen for incoming-call settings allows voice incoming, picture incoming and moving-picture incoming settings.

In case of the picture (still-picture) incoming setting, the up, down, left, right keys 3 are operated so as to situate the cursor C at the picture incoming setting item. If the sharp key on the numeric key pad 4 is pressed, the display screen changes over as shown in FIG. 10.

Now devices (referred to as "devices having incoming-call capability") that can display images are displayed on the liquid crystal display device 2A in list form. The user selects the desired device from among these devices having the image display capability. More specifically, the user employs the cursor C to designate the device to be selected and then presses the sharp key on the numeric key pad 4.

Thus, if there are a plurality of devices having an image display capability, a setting can be made in such a manner that an image will be displayed by the desired device.

Figure 11:
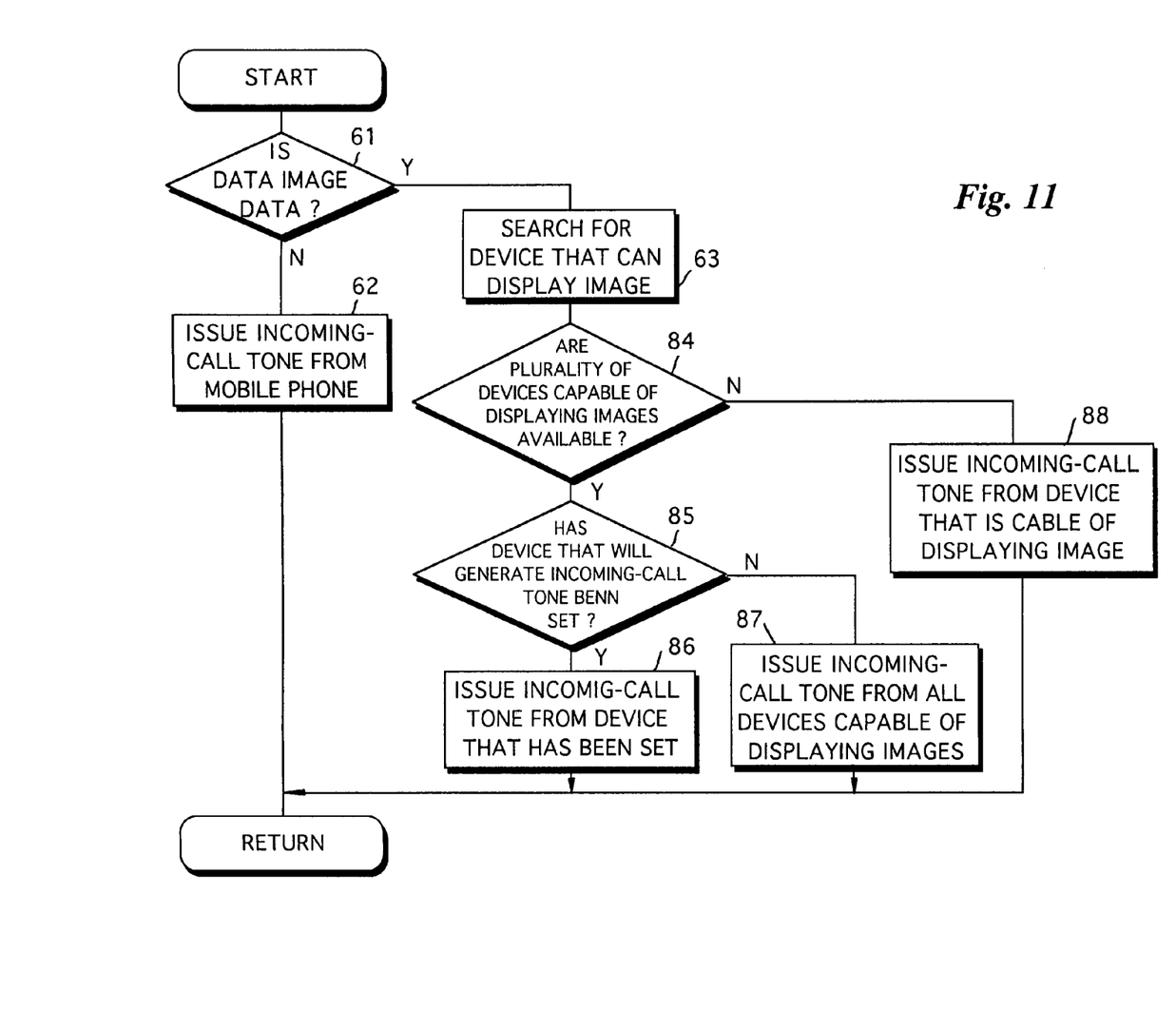
FIGS. 11 and 12 are flowcharts illustrating processing executed when data is transmitted from the data communication apparatus to the mobile telephone.

FIG. 11 is a flowchart illustrating processing executed when data is transmitted from the data communication apparatus 100 to the mobile telephone 1 when the external-device setting has been made according to another embodiment of the present invention. Processing steps in FIG. 11 identical with those shown in FIG. 6 are designated by like step numbers and need not be described again.

If data that will be transmitted from the data communication apparatus 100 is image data ("YES" at step 61), a search for a device that can display the image is conducted (step 63) and it is determined whether there are a plurality of devices that can display the image (step 84).

If there are a plurality of devices having the image display capability ("YES" at step 84), it is determined whether a device that will generate the incoming-call tone has been set in the manner described above (step 85). When such a device has been set ("YES" at step 85), the set device generates the incoming-call tone (step 86). When such a device has not been set ("NO" at step 85), the incoming-call tone is generated by all devices having the image display capability (step 87). When there is only one device having the image display capability ("NO" at step 84), this device generates the incoming-call tone (step 88).

Thus, in a case where there are multiple devices that can display an image, the desired device can be made to generate the incoming-call tone.

Figure 12:
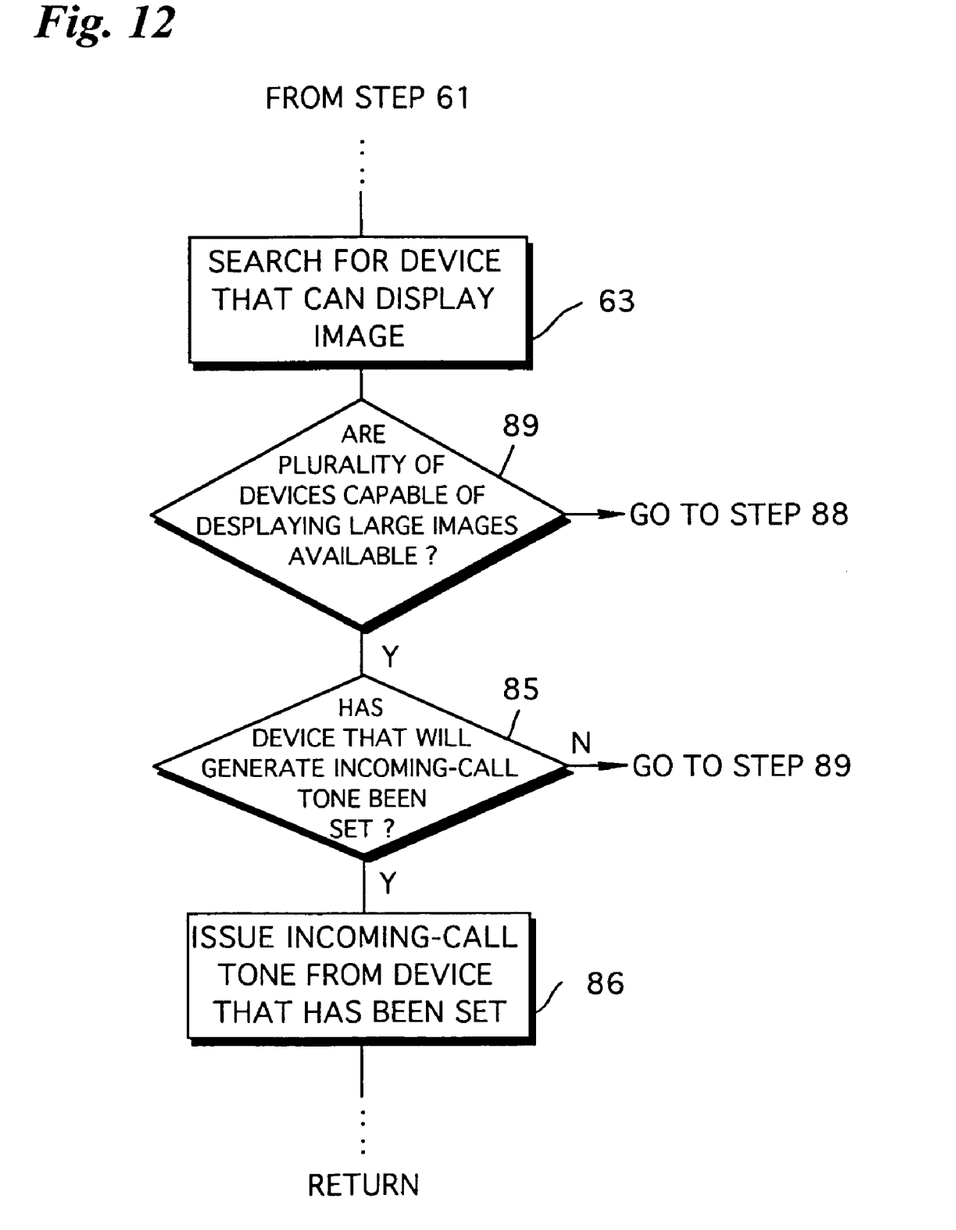

FIG. 12 is a flowchart illustrating part of processing executed when data is transmitted from the data communication apparatus 100 to the mobile telephone 1 in another embodiment of the present invention. This part of the processing corresponds to the processing of steps 63 to 86 in FIG. 11. Processing steps in FIG. 12 identical with those shown in FIG. 11 are designated by like step numbers and need not be described again.

In this processing, it is determined whether there are a plurality of devices capable of displaying large images (step 89). Even though a device capable of displaying an image is available, the device does not necessarily have the capability to display a large image. It is possible that when a device capable of displaying an image generates the incoming-call tone and the user operates the device in response to the tone, the image data that has been sent from the data communication apparatus 100 will represent a large image that cannot be displayed by the device. It is therefore determined whether a device having a large-image display capability is available. Whether image data that will be transmitted from the data communication apparatus 100 represents a large image can be judged from the incoming-call data size contained in the incoming-call preliminary data. Whether a device having a large-image display capability is available would be registered beforehand in the mobile telephone 1. For example, if the device is the digital camera 30, a large image cannot be displayed. If the device is the personal digital assistant 50, however, this can display a large image.

Thus, even if image data that has been received represents a large image, the device that generates the incoming-call tone can be used to display the large image.

As many apparently widely different embodiments of the present invention can be made without departing from the spirit and scope thereof, it is to be understood that the invention is not limited to the specific embodiments thereof except as defined in the appended claims.

What is claimed is:

1. A data communication system comprising a mobile telephone capable of communicating with a communication apparatus via a network, and an image processing unit capable of data communication with said mobile telephone and of image output;

wherein said mobile telephone includes:
  a first data receiving unit for receiving data transmitted from said communication apparatus wherein the received data includes information identifying the received data as voice, text, image or moving picture data;
  a data transmitting unit for transmitting the data received by said first data receiving unit to said image processing unit; and
  an incoming-voice alert generating unit for issuing an incoming-call alert when data that has been received by said first data receiving unit represents voice data; and
said image processing unit includes:
  a second data receiving unit for receiving data transmitted from said data transmitting unit of said mobile telephone; and
  an incoming-image alert generating unit for generating an incoming-call alert when data that has been received by said second data receiving unit represents image data.

2. A mobile telephone capable of communicating with a communication apparatus via a network and with an image processing unit that is capable of outputting an image, comprising:
  a data receiving unit for receiving data transmitted from said communication apparatus wherein the received data includes information identifying the received data as voice, text, image or moving picture data;
  a data transmitting unit for transmitting the data receiving by said data receiving unit to said image processing unit; and
  an incoming-call alert generating unit for issuing a first incoming-call alert when data that has been received by said data receiving unit represents voice data and a second incoming-call alert, which is different from the first incoming-call alert, when the data that has been received by said data receiving unit represents image data.

3. The mobile telephone according to claim 2, further comprising a reception-incapable data transmitting unit which, when said image processing unit is incapable of receiving data, is for transmitting data indicative thereof to said communication apparatus that transmitted the data incapable of being received.

4. A mobile telephone capable of communicating with a communication apparatus via a network and with a plurality of image processing units that are capable of outputting images, comprising:
  a data receiving unit for receiving data transmitted from said communication apparatus wherein the received data includes information identifying the received data as voice, text, image or moving picture data;
  a data transmitting unit for transmitting the data received by said data receiving unit to said image processing units;
  an incoming-voice alert generating unit for issuing an incoming-call alert when data that has been received by said data receiving unit represents voice data;

a setting unit for setting which of said plurality of image processing units is to receive image data; and an incoming-call alert generation controller for controlling the plurality of image processing units in such a manner said image processing unit that has been set by said setting unit will issue an incoming-call alert when it receives data representing image data.

5. An image processing unit capable of data communication with a mobile telephone and of image output, said mobile telephone being capable of communicating with a communication apparatus via a network, said image processing unit comprising:

a data receiving unit for receiving data, which has been transmitted from said communication apparatus and includes information identifying the received data as voice, text, image or moving picture, via said mobile telephone; and an incoming-image alert generating unit for issuing an incoming-call alert when data that has been received by said data receiving unit represents image data.

6. A method of controlling a mobile telephone capable of communicating with a communication apparatus via a network and of communicating with an image processing unit that is capable of outputting an image, said method comprising the steps of:

receiving data, which is transmitted from the communication apparatus and includes information identifying the received data as voice, text, image or moving picture, in such a manner that the data can be transmitted to the image processing unit;

issuing a first incoming-call alert when the received data is voice data; and issuing a second incoming-call alert, which is different from the first incoming-call alert, when the received data is image data.

7. A method of controlling a mobile telephone capable of communicating with a communication apparatus via a network and of communicating with a plurality of image processing units that are capable of outputting images, said method comprising the steps of:

receiving data, which is transmitted from the communication apparatus and includes information identifying the received data as voice, text, image or moving picture, in such a manner that the data can be transmitted to the image processing units;

issuing an incoming-call alert when data that has been received is data representing voice data;

setting which of the plurality of image processing units is to receive image data; and controlling the plurality of image processing units in such a manner the image processing unit that has been set will issue an incoming-call alert when it receives data representing image data.

8. A method of controlling an image processing unit capable of data communication with a mobile telephone and of image output, said mobile telephone being capable of communicating with a communication apparatus via a network, said method comprising the steps of:

receiving data, which has been transmitted from said communication apparatus and includes information identifying the received data as voice, text, image or moving picture, via said mobile telephone; and issuing an incoming-call alert when data that has been received represents image data.

* * * * *